Figure 1:
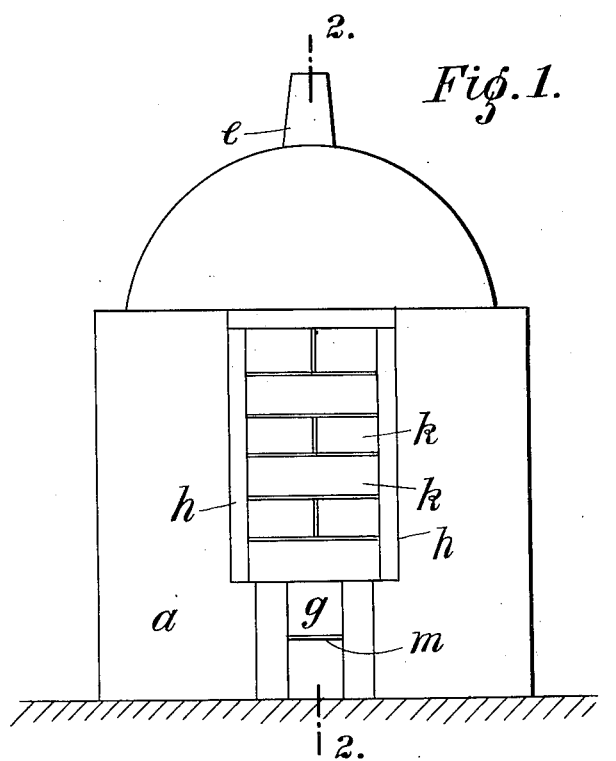

June 24, 1930. F. MULLIGAN 1,766,448
MANUFACTURE OF A CEMENT OR PLASTER FROM GYPSUM
Filed Feb. 20, 1925 2 Sheets-Sheet 1

Inventor
F. Mulligan
by
Atty.

June 24, 1930.  F. MULLIGAN  1,766,448
MANUFACTURE OF A CEMENT OR PLASTER FROM GYPSUM
Filed Feb. 20, 1925  2 Sheets-Sheet 2
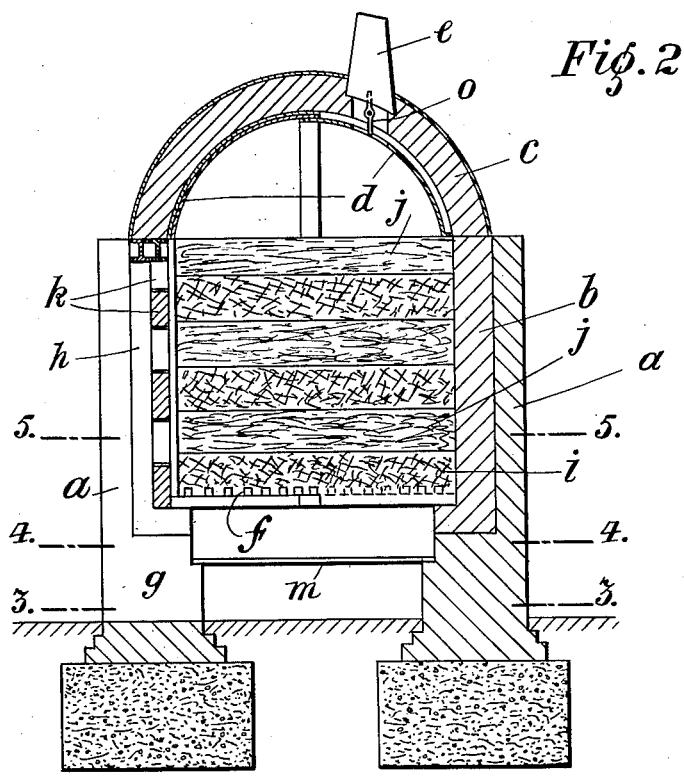
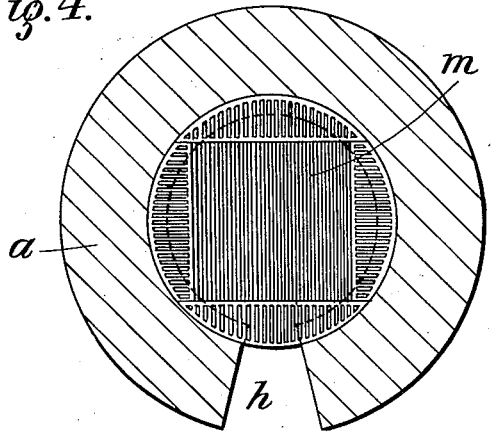
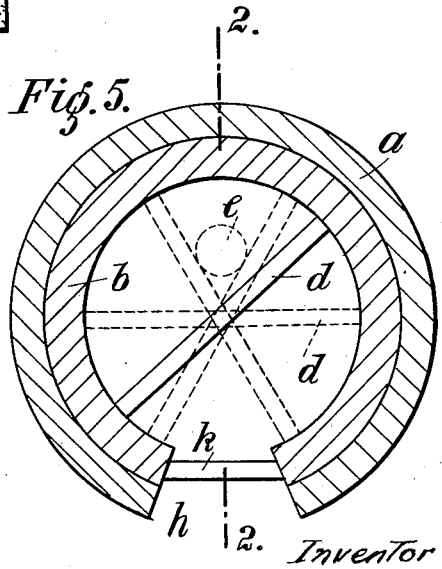
Inventor
F. Mulligan
by Patented June 24, 1930

1,766,448

UNITED STATES PATENT OFFICE

FRANCIS MULLIGAN, OF BELFAST, IRELAND

MANUFACTURE OF A CEMENT OR PLASTER FROM GYPSUM

Application filed February 20, 1925, Serial No. 10,549, and in Great Britain May 28, 1924.

This invention relates to a process of heat treatment of gypsum whereby in one heating operation a cement or plaster product thereof may be obtained which has improved properties as hereinafter described, while retaining the shade of whiteness peculiar to products of gypsum, such as plaster of Paris, stucco, cement plaster, hard-finish plaster, flooring plaster and the like. When using the expression gypsum I wish to include not only natural gypsum and gypsum earths but also artificial gypsum.

There are in existence several varieties of the so-called hydraulic gypsum cement, of which Keene's and Parian cement and flooring plaster are examples. These are produced by various methods of heating and calcining raw gypsum and by adding to the gypsum either before, during, or after such calcination, various chemicals, principally salts of the metals sodium, potassium and iron. The addition of these chemicals is for the express purpose of accelerating the set of, or hardening and otherwise improving, the cements, these chemicals being essential to the production of the properties claimed for the cements.

The process hereinafter described is calculated to produce from raw gypsum, treated as indicated, a product wherein reside the improved qualities hereinafter referred to without the addition of other substances such as required for the production of the qualities hitherto known and associated with gypsum cements or plasters made by other processes.

In the known processes employed in the manufacture of cements and plasters, it is usual to refer to the heat treatment as being carried on at or up to a certain temperature. Thus, in the manufacture of plaster of Paris, it is usual to refer to calcination of the gypsum up to 400° F.; in the manufacture of Keene's cement as heating to 500° C. (932° F.); and so on. In some cases the calcination is referred to very roughly as being carried on at " a full red heat"; "at a glowing heat"; "at a dull red heat"; and so on. This method of defining the heat treatment is not sufficiently definite in cases where a certain critical condition of the gypsum has to be produced as it is obvious, especially when the gypsum is calcined in a closed kiln in conjunction with the fuel, that the product will vary in accordance with the character of the gypsum and the nature of the fuel.

I have carried out numerous experiments and I have found that if gypsum, in lumps and in conjunction with the fuel, is calcined, slowly, in a kiln for a prolonged period of time it can be brought to a critical stage, when its crystalline structure begins to break down, this breaking down being indicated by the development on the surface of the lumps of, a mineral efflorescence whose chemical composition, on analysis, agrees with that of calcium sulphate, I have found that, during the slow calcination, up to this stage, certain chemical and physical reactions (which can not readily be followed) have taken place which are of such a nature that the calcined gypsum taken at this stage, after it is allowed to cool naturally, or is otherwise suitably cooled, and is then pulverized, forms a white cement or plaster possessing such improved, spatial and other properties as shall hereinafter be referred to.

It is important that the gypsum be so calcined that the heat will thoroughly soak through and saturate the mass and that the heat saturation be prolonged until the gypsum mass reaches the aforesaid critical stage.

The fuel in the kiln is carefully proportioned to the gypsum so that when this stage is reached the heat falls gradually, resulting in a slow cooling action. It is desirable that the crystalline structure of the gypsum be preserved but as the appearance of efflorescence clearly indicates that the critical stage has been reached, I carry on the calcination until incipient efflorescence actually appears, as by so doing such appearance clearly indicates to the workman that the material has been sufficiently heat treated and provides an index that insures uniformity of the product. The actual small amount of surface efflorescence produced results in a slight loss but this loss is negligible.

As a preliminary step, it is necessary to ascertain the ratio of fuel to gypsum required for the particular fuel and particular gypsum to be used, if this ratio is not already known. This ratio is usually known approximately, and by a series of experiments of trial and error on a small scale, the correct ratio of fuel to gypsum, which will cause calcination to the stage of incipient efflorescence to take place and the combustion then to cease, can be found for a particular case.

In carrying out the invention I preferably use a kiln such as shown in the drawings and I build up the fuel, preferably a good quality of Scottish splint coal and North of Ireland lump gypsum in alternate layers, the kiln charge being say five tons of gypsum and twelve and one-half hundredweights of coal, i. e., a ratio of fuel to gypsum of one to eight, which ratio of fuel I have found to be sufficient to generate in the aforesaid kiln a heat sufficient to effect the chemical changes hereinbefore referred to within a period of ten to fifteen hours. After the calcination to the incipient efflorescence stage has been completed, the mass is allowed to cool naturally, or is cooled, and is thereafter pulverized by any suitable machinery, when it forms the white hydraulic cement or plaster aforesaid.

The kiln which I prefer to use and which is shown by way of example in the drawing is of such construction that the calcination is carried on slowly, and the hot gases, generated by the combustion of the fuel, thoroughlpy permeate the gypsum which, after being dehydrated, is exceedingly porous, and these highly heated gases acting during the preliminary period of calcination produce the chemical and physical changes in the character of the gypsum. According to the nature of the gypsum being treated and the calorific value of the fuel, the fuel ratio may be slightly increased or diminished, but the ratio of fuel must not be increased to such an extent as to cause sintering or clinkering of the mass, conditions which have been found to be harmful to the product.

Figure 3:
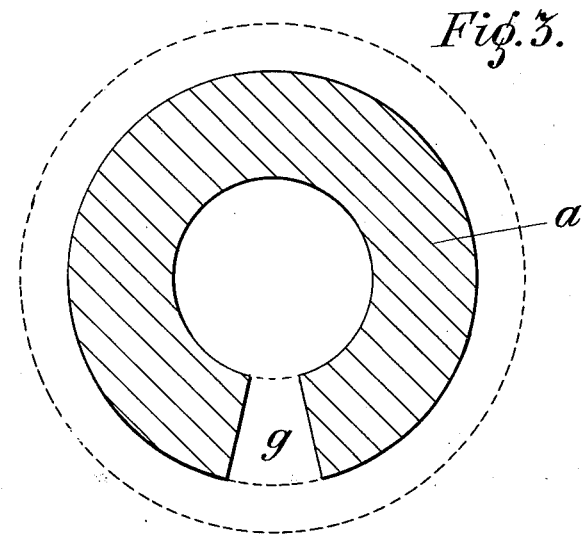

Fig. 1 is an elevation; Fig. 2 a vertical section on the line 2—2 Figs. 1 and 5; Fig. 3 a sectional plan on the line 3—3 Fig. 2; Fig. 4 a sectional plan on the line 4—4 Fig. 2; and Fig. 5 a section (looking upwards) on the line 5—5 Fig. 2.

As will be seen the kiln has a cylindrical wall $a$ with lining $b$ of firebrick, and firebrick dome top $c$ supported by metal stays $d$. $e$ is the outlet flue, $f$ the floor grate, $g$ the air-inlet and $m$ the fire grate. It will be seen the front is left open at $h$ so that the fuel and gypsum can be conveniently and carefully stacked upon the floor grate in layers indicated at $i$, $j$, and after the stacking is completed the front is closed by fire-clay slabs $k$. It will be seen the outlet flue $e$ is small compared with the capacity of the kiln and the floor grate area so that slow combustion is assured. The starting fire is placed on the grating $m$. For the purpose of controlling the heat a damper $o$ may be provided.

The following may be taken as a typical example of the carrying out of the process.

The kiln is about 9 feet high and the opening in the front is about 2 feet wide.

North of Ireland gypsum in lumps and a good quality of Scottish round coal are charged into the kiln in alternate layers, the charging taking place through the front opening and the proportion of gypsum to fuel being 4½ tons of gypsum to 11 hundredweights of coal.

A fire is made with shavings, sticks or the like on the fire-grate which is about three feet below the floor grate which supports the kiln charge. This starting fire is kept burning brightly until the kiln charge is burning well, the front having been previously closed up with the fire-clay slabs $k$.

The charge burns without much attention for about 15 hours whereafter a period of 48 hours is allowed for cooling. The kiln is then opened and the lumps of calcined gypsum removed, these lumps having a slight development of efflorescence on their surfaces.

Attempt has been made to ascertain the temperature during the burning but it was found impossible to get the thermocouple of the instrument into a satisfactory position. The highest temperature recorded is about 650° C. but probably the temperature of the properly burning mass is much higher, from 900° C. to 1000° C. As was pointed out before, a knowledge of the temperature of burning is not required.

If a specially white product is required, the lumps of calcined gypsum are brushed clean with a wire brush. In any case, after burning, the product is fed into disintegrators and the resultant powder sieved to 200 mesh, at the same time being mixed with ½% of alum.

The white powder mentioned above is known as No. 1, and the ordinary slightly coloured product is known as No. 2 cement.

Microscopic examination of cement properly prepared as above definitely shows that it is of a crystalline structure. Further tests definitely show that all the water of crystallization has been lost during calcination, the cement being therefore anhydrous, but not amorphous. Examination of samples which had over-burned revealed the fact that the crystalline structure had been lost. Therefore, it is apparent that the efflorescence referred to occurs just where the crystalline structure of the gypsum is about to break down or is just breaking down.

When it is desired to empty the kiln the fireclay slabs are removed, giving ready access to the interior, and the lumps of calcined gypsum carefully picked out. Any ash or the like readily falls away from the lumps. Some of the lumps may have slight local soiling which can be removed by brushing with a stiff brush, or by cutting or scraping the lumps.

It is important that in the type of kiln aforesaid the lump gypsum and the fuel be very carefully stacked throughout the kiln in accordance with the ratio of fuel to gypsum hereinbefore referred to in order that all the gypsum shall be uniformly and thoroughly heated and partial fusion may be avoided and also that the gases of combustion shall penetrate and act on the whole mass of gypsum. The stacking can be readily done owing to the open front of the kiln. When the kiln is closed up, by the slabs $k$ being fitted into the V shaped opening $h$, the air can only gain access to the interior of the kiln through the reduced opening $g$ whilst the waste products of combustion escape by the small flue $e$.

If powdered gypsum be used it is preferably calcined in the briquetted form.

Although I have described and shown a suitable type of kiln, I do not confine myself thereto.

Alum, nitre, or the like may be added, and it may be associated with the gypsum before calcination, or it may be added in the course of pulverization of the calcined mass or to the finished product. The proportion of such agent may be low, as little as one quarter per cent of the weight of gypsum being usually sufficient.

The cement or plaster produced by the plaster herein described has superior properties. It is intensely white, has a good spreading capacity, and sets very hard. Further, it has the property of setting under water which is a valuable characteristic.

Having now fully described my invention what I claim and desire to secure by Letters Patent is:—

1. A process for the manufacture of a cement or plaster from gypsum, in one heating operation, comprising stacking crude gypsum together with coal in a closed kiln and in about the proportion by weight of one part of coal to eight parts of gypsum, subjecting the gypsum to slow calcination by burning the coal so that in the process of calcination the products of combustion are caused to permeate the gypsum and thoroughly act thereon for such a period of time as will bring the gypsum to a stage when efflorescence begins to appear, and then cooling the calcined mass.

2. A process for the manufacture of a cement or plaster from gypsum in one heating operation, comprising stacking gypsum in briquette form together with coal in a closed kiln and in about the proportion by weight of one part of coal to eight parts of gypsum, subjecting the gypsum to slow calcination by burning the coal so that in the process of calcination the products of combustion are caused to permeate the gypsum and thoroughly act thereon for such a period of time as will bring the gypsum to a stage when efflorescence begins to appear, and then cooling the calcined mass.

In testimony whereof I affix my signature.

FRANCIS MULLIGAN.